(12) United States Patent  
Zheng et al.

(10) Patent No.: US 9,386,088 B2
(45) Date of Patent: Jul. 5, 2016

(54) ACCELERATING SERVICE PROCESSING USING FAST PATH TCP

(75) Inventors: Wei Zheng, Fremont, CA (US); Liang Han, Pleasanton, CA (US)

(73) Assignee: A10 Networks, Inc., San Jose, CA (US)

( * ) Notice: Subject to any disclaimer, the term of this patent is extended or adjusted under 35 U.S.C. 154(b) by 664 days.

(21) Appl. No.: 13/567,115

(22) Filed: Aug. 6, 2012

(65) Prior Publication Data

US 2013/0136139 A1 May 30, 2013

Related U.S. Application Data

(60) Provisional application No. 61/564,575, filed on Nov. 29, 2011.

(51) Int. Cl.
*H04L 29/08* (2006.01)
*H04L 29/06* (2006.01)

(52) U.S. Cl.
CPC .......... *H04L 67/1014* (2013.01); *H04L 69/161* (2013.01)

(58) Field of Classification Search
CPC ....... H04L 47/10; H04L 69/16; H04L 69/161; H04L 69/163; H04L 69/32
See application file for complete search history.

(56) References Cited

U.S. PATENT DOCUMENTS

| | | |
|---|---|---|
| 5,218,602 A | 6/1993 | Grant et al. |
| 5,774,660 A | 6/1998 | Brendel et al. |
| 5,935,207 A | 8/1999 | Logue et al. |
| 5,958,053 A | 9/1999 | Denker |
| 6,003,069 A | 12/1999 | Cavill |
| 6,047,268 A | 4/2000 | Bartoli et al. |
| 6,219,706 B1 | 4/2001 | Fan et al. |
| 6,321,338 B1 | 11/2001 | Porras et al. |
| 6,374,300 B2 | 4/2002 | Masters |
| 6,587,866 B1 | 7/2003 | Modi et al. |
| 6,748,414 B1 | 6/2004 | Bournas |

(Continued)

FOREIGN PATENT DOCUMENTS

| | | |
|---|---|---|
| CN | 1372662 | 10/2002 |
| CN | 1449618 | 10/2003 |

(Continued)

OTHER PUBLICATIONS

Spatscheck et al., "Optimizing TCP Forwarder Performance", IEEE/ACM Transactions on Networking, vol. 8, No. 2, Apr. 2000.

(Continued)

*Primary Examiner* — Raj Jain
(74) *Attorney, Agent, or Firm* — Carr & Ferrell LLP

(57) ABSTRACT

A service gateway includes a fast path module for processing data packets without using packet buffers and a normal path module for processing data packets using packet buffers. The fast path module receives a service request data packet from a client side session, determines that the service request data packet cannot be processed by the fast path module, and in response, sends the service request data packet to the normal path module. After receiving the service request data packet, the normal path module retrieves a first proxy session record created by the fast path module, where the first proxy session record is associated with a client session record for the client side session, creates a second proxy session record based on the service request data packet and the client session record, and processes the service request data packet according to the second proxy session record.

12 Claims, 10 Drawing Sheets

(56) References Cited

U.S. PATENT DOCUMENTS

| | | |
|---|---|---|
| 6,772,334 B1 | 8/2004 | Glawitsch |
| 6,779,033 B1 | 8/2004 | Watson et al. |
| 7,010,605 B1 | 3/2006 | Dharmarajan |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,181,524 B1 | 2/2007 | Lele |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,467,202 B2 | 12/2008 | Savchuk |
| 7,472,190 B2 | 12/2008 | Robinson |
| 7,506,360 B1 | 3/2009 | Wilkinson et al. |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,707,295 B1 | 4/2010 | Szeto et al. |
| 7,711,790 B1 | 5/2010 | Barrett et al. |
| 7,747,748 B2 | 6/2010 | Allen |
| 7,792,113 B1 | 9/2010 | Foschiano et al. |
| 7,826,487 B1 | 11/2010 | Mukerji et al. |
| 7,881,215 B1 | 2/2011 | Daigle et al. |
| 7,970,934 B1 | 6/2011 | Patel |
| 7,990,847 B1 | 8/2011 | Leroy et al. |
| 7,991,859 B1 | 8/2011 | Miller et al. |
| 8,090,866 B1 | 1/2012 | Bashyam et al. |
| 8,122,116 B2 | 2/2012 | Matsunaga et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,296,434 B1 | 10/2012 | Miller et al. |
| 8,312,507 B2 | 11/2012 | Chen et al. |
| 8,379,515 B1 | 2/2013 | Mukerji |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,681,610 B1 | 3/2014 | Mukerji |
| 8,782,221 B2 | 7/2014 | Han |
| 8,813,180 B1 | 8/2014 | Chen et al. |
| 8,826,372 B1 | 9/2014 | Chen et al. |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0131245 A1 | 7/2003 | Linderman |
| 2003/0135625 A1 | 7/2003 | Fontes et al. |
| 2003/0195962 A1 | 10/2003 | Kikuchi et al. |
| 2004/0062246 A1* | 4/2004 | Boucher et al. ............... 370/392 |
| 2004/0073703 A1* | 4/2004 | Boucher et al. ............... 709/245 |
| 2004/0078419 A1 | 4/2004 | Ferrari et al. |
| 2004/0078480 A1* | 4/2004 | Boucher et al. ............... 709/237 |
| 2004/0111516 A1 | 6/2004 | Cain |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210663 A1 | 10/2004 | Phillips et al. |
| 2004/0213158 A1 | 10/2004 | Collett et al. |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0118881 A1 | 5/2007 | Mitchell et al. |
| 2007/0156919 A1 | 7/2007 | Potti et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0228781 A1 | 9/2008 | Chen et al. |
| 2008/0250099 A1 | 10/2008 | Shen et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |

(56) References Cited

U.S. PATENT DOCUMENTS

| | | |
|---|---|---|
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1* | 5/2009 | Moran et al. ............... 709/227 |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0228547 A1 | 9/2009 | Miyaoka et al. |
| 2010/0008229 A1 | 1/2010 | Bi et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0083076 A1 | 4/2010 | Ushiyama |
| 2010/0094985 A1 | 4/2010 | Abu-Samaha et al. |
| 2010/0106833 A1 | 4/2010 | Banerjee et al. |
| 2010/0106854 A1 | 4/2010 | Kim et al. |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1* | 9/2010 | Chen et al. ............... 709/228 |
| 2010/0235880 A1 | 9/2010 | Chen et al. |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0093522 A1 | 4/2011 | Chen et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0302256 A1 | 12/2011 | Sureshchandra et al. |
| 2011/0307541 A1 | 12/2011 | Walsh et al. |
| 2012/0023231 A1 | 1/2012 | Ueno |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0144014 A1 | 6/2012 | Natham et al. |
| 2012/0144015 A1 | 6/2012 | Jalan et al. |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0046876 A1 | 2/2013 | Narayana et al. |
| 2013/0074177 A1 | 3/2013 | Varadhan et al. |
| 2013/0083725 A1 | 4/2013 | Mallya et al. |
| 2013/0100958 A1 | 4/2013 | Jalan et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0198385 A1 | 8/2013 | Han et al. |
| 2014/0012972 A1 | 1/2014 | Han |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258536 A1 | 9/2014 | Chiong |
| 2014/0269728 A1 | 9/2014 | Jalan et al. |
| 2014/0330982 A1 | 11/2014 | Jalan et al. |
| 2014/0359052 A1 | 12/2014 | Joachimpillai et al. |
| 2015/0039671 A1 | 2/2015 | Jalan et al. |
| 2015/0156223 A1 | 6/2015 | Xu et al. |

FOREIGN PATENT DOCUMENTS

| | | |
|---|---|---|
| CN | 1529460 | 9/2004 |
| CN | 1575582 | 2/2005 |
| CN | 1714545 | 12/2005 |
| CN | 1725702 | 1/2006 |
| CN | 101004740 | 7/2007 |
| CN | 101094225 | 12/2007 |
| CN | 101169785 | 4/2008 |
| CN | 101189598 | 5/2008 |
| CN | 101247349 | 8/2008 |
| CN | 101261644 | 9/2008 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 | 7/2015 |
| EP | 1209876 A2 | 5/2002 |
| EP | 1770915 A1 | 4/2007 |
| EP | 1885096 A1 | 2/2008 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 | 8/2015 |
| HK | 1182560 | 11/2013 |
| HK | 1183569 A | 12/2013 |
| HK | 1183996 A | 1/2014 |
| HK | 1189438 | 6/2014 |
| HK | 1198565 | 5/2015 |
| HK | 1198848 | 6/2015 |
| HK | 1199153 | 6/2015 |
| HK | 1199779 | 7/2015 |
| IN | 3764CHENP2014 | 9/2015 |
| JP | H09-097233 | 4/1997 |
| JP | H11-338836 | 10/1999 |
| JP | 2000276432 | 10/2000 |
| JP | 2000307634 | 11/2000 |
| JP | 2001051859 | 2/2001 |
| JP | 2006332825 | 12/2006 |
| JP | 2008040718 | 2/2008 |
| JP | 2013528330 | 5/2011 |
| JP | 2014-143686 | 8/2014 |
| JP | 2015507380 | 3/2015 |
| KR | 10-0830413 B1 | 5/2008 |
| WO | 01/13228 A2 | 2/2001 |
| WO | 0114990 | 3/2001 |
| WO | WO2001045349 | 6/2001 |
| WO | 03103237 | 12/2003 |
| WO | WO2004084085 | 9/2004 |
| WO | 2008053954 | 5/2008 |
| WO | 2011049770 A2 | 4/2011 |
| WO | WO2011079381 | 7/2011 |
| WO | 2011149796 A2 | 12/2011 |
| WO | 2012050747 | 4/2012 |
| WO | 2012075237 A2 | 6/2012 |
| WO | 2013070391 A1 | 5/2013 |
| WO | 2013081952 A1 | 6/2013 |

(56) References Cited

FOREIGN PATENT DOCUMENTS

| WO | 2013096019 A1 | 6/2013 |
|---|---|---|
| WO | 2013112492 | 8/2013 |
| WO | 2014052099 | 4/2014 |
| WO | 2014088741 | 6/2014 |
| WO | 2014093829 | 6/2014 |
| WO | 2014138483 | 9/2014 |
| WO | 2014144837 | 9/2014 |
| WO | WO 2014179753 | 11/2014 |

OTHER PUBLICATIONS

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Cardellini et al., "Dynamic Load Balancing on Web-server Systems", IEEE Internet Computing, vol. 3, No. 3, pp. 28-39, May-Jun. 1999.

Hunt et al. NetDispatcher: A TCP Connection Router, IBM Research Report RC 20853, May 19, 1997.

Noguchi, "Realizing the Highest Level "Layer 7" Switch" = Totally Managing Network Resources, Applications, and Users =, Computer & Network LAN, Jan. 1, 2000, vol. 18, No. 1, p. 109-112.

Takahashi, "The Fundamentals of the Windows Network: Understanding the Mystery of the Windows Network from the Basics", Network Magazine, Jul. 1, 2006, vol. 11, No. 7, p. 32-35.

Ohnuma, "AppSwitch: 7th Layer Switch Provided with Full Setup and Report Tools", Interop Magazine, Jun. 1, 2000, vol. 10, No. 6, p. 148-150.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

* cited by examiner

US 9,386,088 B2

ACCELERATING SERVICE PROCESSING USING FAST PATH TCP

CROSS-REFERENCE TO RELATED APPLICATIONS

The present application claims priority to U.S. provisional patent application Ser. No. 61/564,575, filed on Nov. 29, 2011, and is incorporated herein in its entirety by reference.

BACKGROUND OF THE INVENTION

1. Field

This present invention relates generally to data communications, and more specifically, to a service gateway.

2. Background

Fast path HTTP is an implementation of HTTP proxy service in a service gateway such as a server load balancer or an application delivery controller. Examples of fast path HTTP can be found in products such as A10 Networks™ AX Series Server Load Balancers. Fast path HTTP is optimized for high performance, often with hardware-based accelerator support. A major difference between a typical or normal HTTP implementation and a fast-path HTTP mode is that handling of the underlying TCP (Transmission Control Protocol) session of fast path HTTP does not use a normal or full TCP stack. Instead, fast-path HTTP uses a fast path or light weight TCP (LW-TCP) stack that handles sequence (SEQ) and acknowledge (ACK) number adjustments for proxy purposes, without the packet buffering used in a normal TCP stack. Thus, fast-path HTTP processing can achieve a higher level of performance compared to the normal HTTP processing.

However, the lack of a normal TCP stack poses challenges for corner cases and special protocol handling. In one example, when a TCP packet containing a partial HTTP request is received at the service gateway, where the partial HTTP request contains a partial URI. The partial URI information may not contain sufficient information for the service gateway such as a HTTP server load balancer to select a back end server. In this example, the service gateway needs to wait for additional TCP packets carrying the remaining HTTP request. However, to avoid the client of the HTTP request from unnecessarily retransmitting the earlier received TCP packet, the service gateway needs to send a TCP ACK to the client. In a different protocol handling situation, the service gateway may need to retransmit TCP packets to the server. Such handling of ACK and retransmission are found in a normal TCP stack implementation and require additional processing in a typical LW-TCP stack.

Even though occurrences of corner cases are infrequent, special handling of the corner cases in either fast path HTTP or LW-TCP modules is error prone and performance affecting, considering the various combinations of corner cases in an actual network. Any performance gain of fast path HTTP may be offset by the corner cases processing. It is appropriate, however, not to consider any special handling in fast-path HTTP, but rather to allow these cases to be handled by the normal HTTP processing.

Therefore, there is a need for a system and method to transition from a fast-path HTTP processing scenario to a normal HTTP processing.

BRIEF SUMMARY OF THE INVENTION

According to one embodiment of the present invention, a service gateway comprises: a fast path module for processing data packets without using packet buffers; and a normal path module for processing data packets using one or more packet buffers, wherein the fast path module: receives a service request data packet from a client side session between a client and the service gateway; determines that the service request data packet cannot be processed by the fast path module; and in response to determining that the service request data packet cannot be processed by the fast path module, sends the service request data packet to the normal path module, wherein in response to receiving the service request data packet from the fast path module, the normal path module: retrieves a first proxy session record created by the fast path module, wherein the first proxy session record is associated with a client session record for the client side session; creates a second proxy session record based on the service request data packet and the client session record associated with the first proxy session record; and processes the service request data packet according to the second proxy session record.

In one aspect of the present invention, wherein in determining that the service request data packet cannot be processed by the fast path module, the fast path module: determines that the service request data packet: does not contain a complete HTTP header; contains only a partial URI; contains only a partial HTTP header field; contains only a partial HTTP cookie field; indicates an IP packet fragment; contains an unexpected URI; does not contain an expected cookie field; or does not contain an expected HTTP header attribute.

In one aspect of the present invention, wherein in creating the second proxy session record, the normal path module: creates a second client session record based on the client session record associated with the first proxy session record and the service request data packet; and associates the second client session record with the second proxy session record.

In one aspect of the present invention, wherein the client side session comprises a TCP session, wherein in creating the second proxy session record, the normal path module further: obtains a client session receiving initial sequence number and a client session sending initial sequence number from the client session record associated with the first proxy session record; creates one or more TCP session state variables and one or more packet buffers for the client side session; and stores the client session receiving initial sequence number, the client session sending initial sequence number, and the one or more TCP session state variables in the second client session record.

In one aspect of the present invention, the fast path module further: determines that the service request data packet can be processed by the fast path module; in response to determining that the service request data packet can be processed by the fast path module, adjusts sequence numbers in the service request data packet using a calculated client session sequence number adjustment stored in the first proxy session record; and sends the adjusted service request data packet over a server side session between a server and the service gateway.

In one aspect of the present invention, in adjusting the sequence numbers in the service request data packet, the fast path module: adjusts a sequence number in the service request data packet by the calculated client session sequence number adjustment; and adjusts an acknowledgement number in the service request data packet by the calculated client session sequence number adjustment.

System and methods corresponding to the above-summarized service gateway are also described and claimed herein.

DETAILED DESCRIPTION OF THE INVENTION

Figure 1:
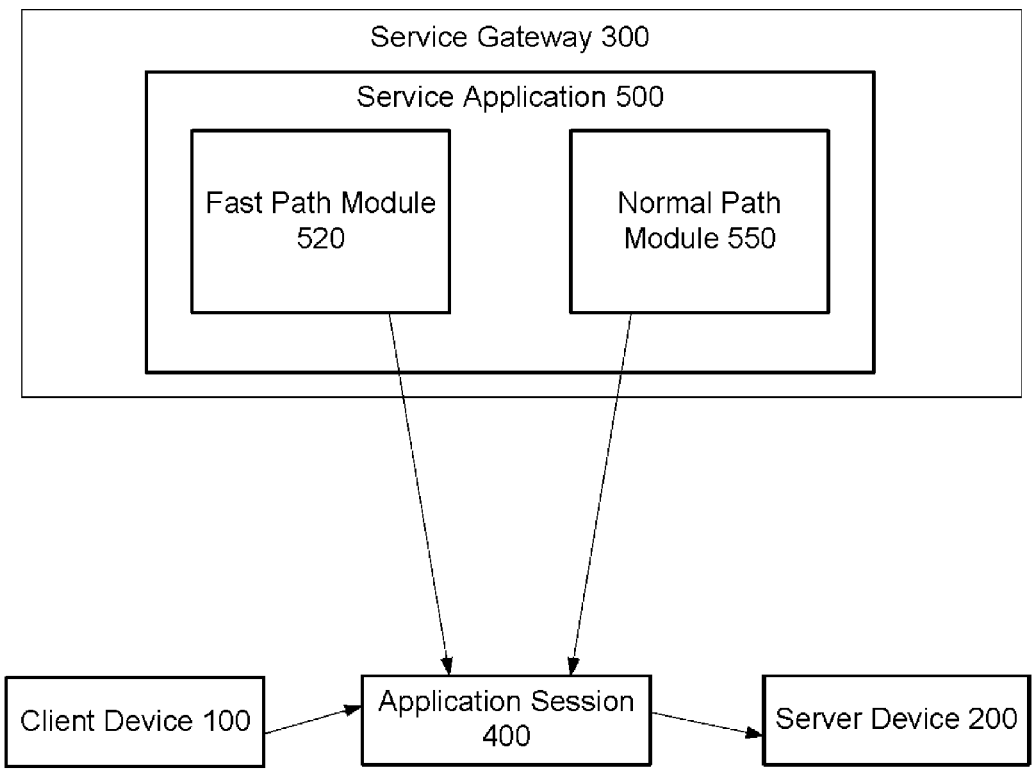
FIG. 1 illustrates an embodiment of a service gateway servicing a service application between a client device and a server device according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport eh program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a service gateway 300 processing an application session 400 between a client device 100 and server device 200 according to the present invention.

Figure 2:
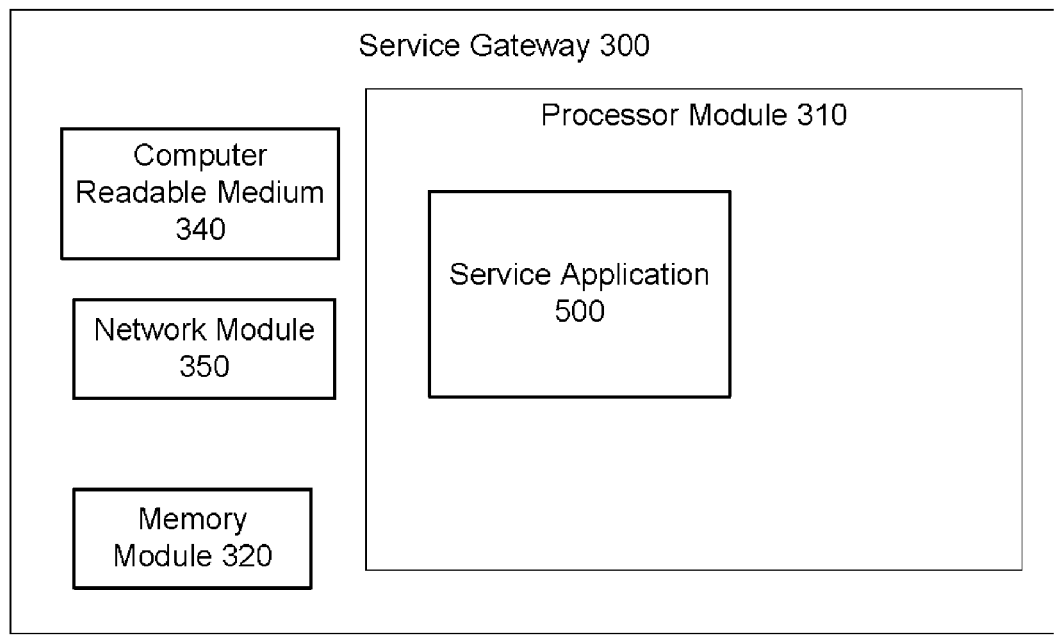
FIG. 2 illustrates an embodiment of a service gateway according to the present invention.

An embodiment of the service gateway 300, illustrated in FIG. 2, is operationally coupled to a processor module 310, a memory module 320, a network interface module 350, and a computer readable module 340. The computer readable medium 340 stores computer readable program code, which when executed by the processor module 310 using the memory module 320, implements the various embodiments of the present invention as described herein. In some embodiments, service gateway 300 is implemented as a server load balancer, an application delivery controller, a service delivery platform, a traffic manager, a security gateway, a component of a firewall system, a component of a virtual private network (VPN), a load balancer for video servers, a gateway to distribute load to one or more servers, a Web or HTTP server handling the HTTP layer of the HTTP service session, or a gateway performing network address translation (NAT).

In one embodiment, computer readable medium 340 includes instructions for service application 500 and processor module 310 executes service application 500. Embodiments of service application 500 include server load balancing services, network address translation, firewall, remote access services, HTTP proxy services, TCP proxy services, audio or video streaming services, Web services, content delivery services, WAN optimization services, mobile Internet services, and content caching services.

Returning to FIG. 1, client device 100 is typically a computing device with network access capabilities. In one embodiment, client device 100 is a workstation, a desktop personal computer or a laptop personal computer, a Personal Data Assistant (PDA), a tablet computing device, a smartphone, or a cellular phone, a set-top box, an Internet media viewer, an Internet media player, a smart sensor, a smart medical device, a net-top box, a networked television set, a networked DVR, a networked Blu-ray player, a networked handheld gaming device, or a media center.

In one embodiment, client device 100 is a residential broadband gateway, a business Internet gateway, a business Web proxy server, a network customer premise device (CPE), or an Internet access gateway.

In one embodiment, client device 100 includes a broadband remote access server (BRAS), a Digital Subscriber Line Access Multiplexer (DSLAM), a Cable Modem Terminating System (CMTS), or a service provider access gateway.

In one embodiment, client device 100 includes a mobile broadband access gateway such as a Gateway GPRS Support Node (GGSN), a Home Agent (HA), or a PDN Gateway (PGW).

In one embodiment, client device 100 includes a server load balancer, an application delivery controller, a traffic manager, a firewall, a VPN server, a remote access server, or an enterprise or datacenter access gateway.

In one embodiment, client device 100 is a device comprising similar components as service gateway 300.

Client device 100 initiates application session 400 towards server device 200.

Server device 200 is a computing device typically coupled to a processor and a computer readable medium which stores computer readable program code. Server device 200, with the processor and the computer readable program code, implements functionality of a Web server, a file server, a video server, a database server, an application server, a voice system, a conferencing server, a media gateway, a media center, an app server or a network server providing a TCP-based service or an application service to client device 100 using application session 400.

Embodiments of application session 400 includes a HTTP session, a file transfer session, a TCP-based video streaming session, a TCP-based music or video streaming session, a file download session, a group conferencing session, a database access session, a remote terminal access session, a Telnet session, a e-commerce transaction, a remote procedure call, and other uses of TCP communication sessions.

Service application 500 includes a fast path module 520 and a normal path module 550. Normal path module 550 processes application session 400 with a typical TCP packet buffering mechanism, as known to those skilled in the art. Fast path module 520 processes TCP packets of application session 400 without a packet buffer. Both processing will be described subsequently in this specification.

Figure 3:
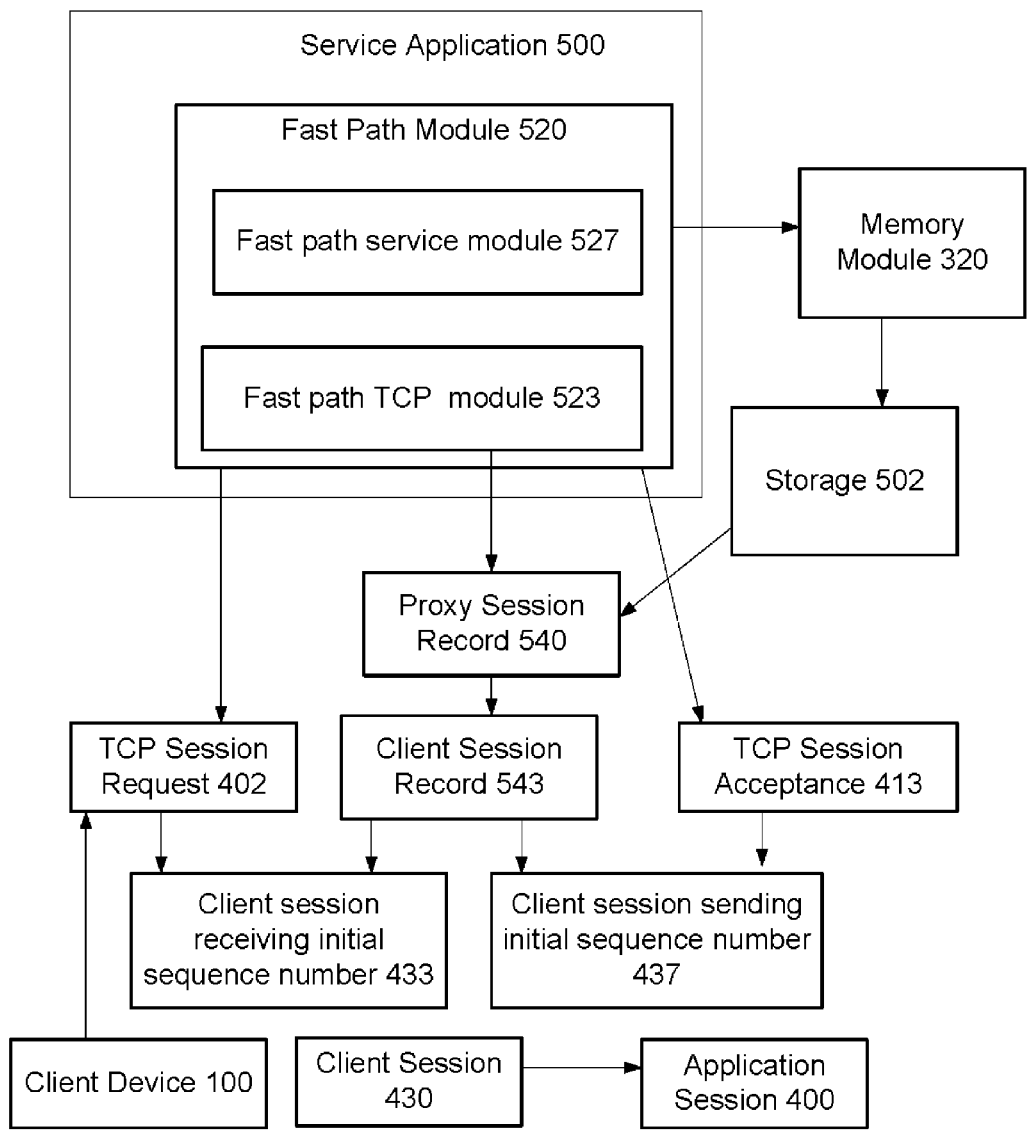
FIG. 3 illustrates an embodiment of a fast-path service application processing a TCP session request according to the present invention.

FIG. 3 illustrates an embodiment of the processing of fast path module 520 according to the present invention. In one embodiment, client device 100 sends a TCP session request 402 data packet to service gateway 300 to establish a client TCP session 430 for application session 400. Service application 500 receives TCP session request 402 and uses fast path module 520 to handle TCP session request 402. In one embodiment, fast path module 520 includes fast path TCP module 523 and fast path service module 527.

Fast path TCP module 523 receives TCP session request 402, and creates a client session record 543 and an associated proxy session record 540. In one embodiment, proxy session record 540 includes client session record 543. In one embodiment, service application 500 connects to storage 502, such as memory module 320. Fast path TCP module 523 stores proxy session record 540 and client session record 543 in storage 502. Fast path TCP module 523 obtains several pieces of information from TCP session request 402 and stores the information into client session record 543. In one embodiment, the information of TCP session request 402 includes one or more of client session receiving initial sequence number 433, IP source and destination addresses, TCP source and destination port numbers, lower layer network addresses such as MAC addresses, VLAN addresses, WLAN addresses, and information about link layer, physical layer, tunneling session obtained from or using TCP session request 402.

In one embodiment, fast path TCP module 523 accepts the TCP session request 402 and responds with a TCP session acceptance 413 data packet. In this embodiment, fast path TCP module 523 generates an initial sequence number 437, or client session sending initial sequence number 437, in response to TCP request packet 402. Fast path TCP module 523 stores initial sequence number 437 in client session record 543, sends TCP session acceptance 413 to client device 100, and establishes client session 430.

Figure 4:
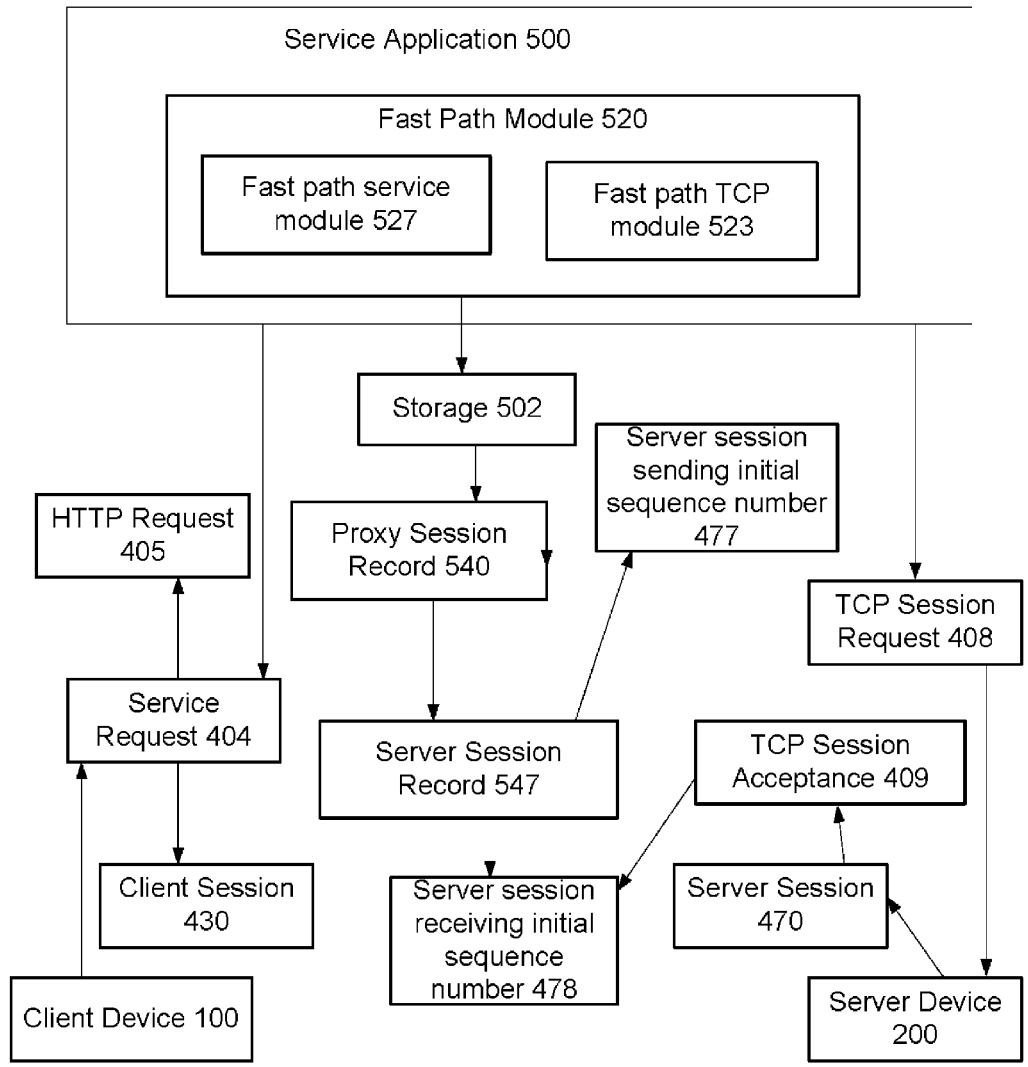
FIG. 4 illustrates an embodiment of a fast-path service application processing a HTTP service request according to the present invention.

In one embodiment illustrated in FIG. 4, after the client session 430 is established, client device 100 sends a service request 404 data packet to service gateway 300 over client session 430 in order to establish an application level session for application session 400. In one embodiment, service request 404 includes HTTP request 405. Service application 500 receives service request 404. Fast path TCP module 523 compares service request 404 against one or more client session records in storage 502 and obtains client session record 543 corresponding to client session 430.

Service application 500 invokes fast path service module 527 to process service request 404. In one embodiment, fast path service module 527 retrieves HTTP request 405 from service request 404, and selects server device 200 to service HTTP request 405. In one embodiment, fast path service module 527 instructs fast path TCP module 523 to establish server TCP session 470 with server device 200. Fast path TCP module 523 creates server session record 547 and associates server session record 547 with proxy session record 540. In one embodiment, fast path TCP module 523 stores server session record 547 in storage 502. In one embodiment, proxy session record 540 includes server session record 547.

In one embodiment, fast path TCP module 523 creates server session sending initial sequence number 477 and uses initial sequence number 477 to create TCP session request data packet 408. Fast path TCP module 523 sends TCP session request 408 to server device 200. In one embodiment, server device 200 accepts TCP service request 408 and responds with TCP session acceptance data packet 409. Fast path TCP module 523 retrieves a piece of information from TCP session acceptance 409. In one embodiment, the TCP session acceptance 409 information includes server session receiving initial sequence number 478. Fast path TCP module 523 stores initial sequence number 478 in server session record 547.

Figure 5:
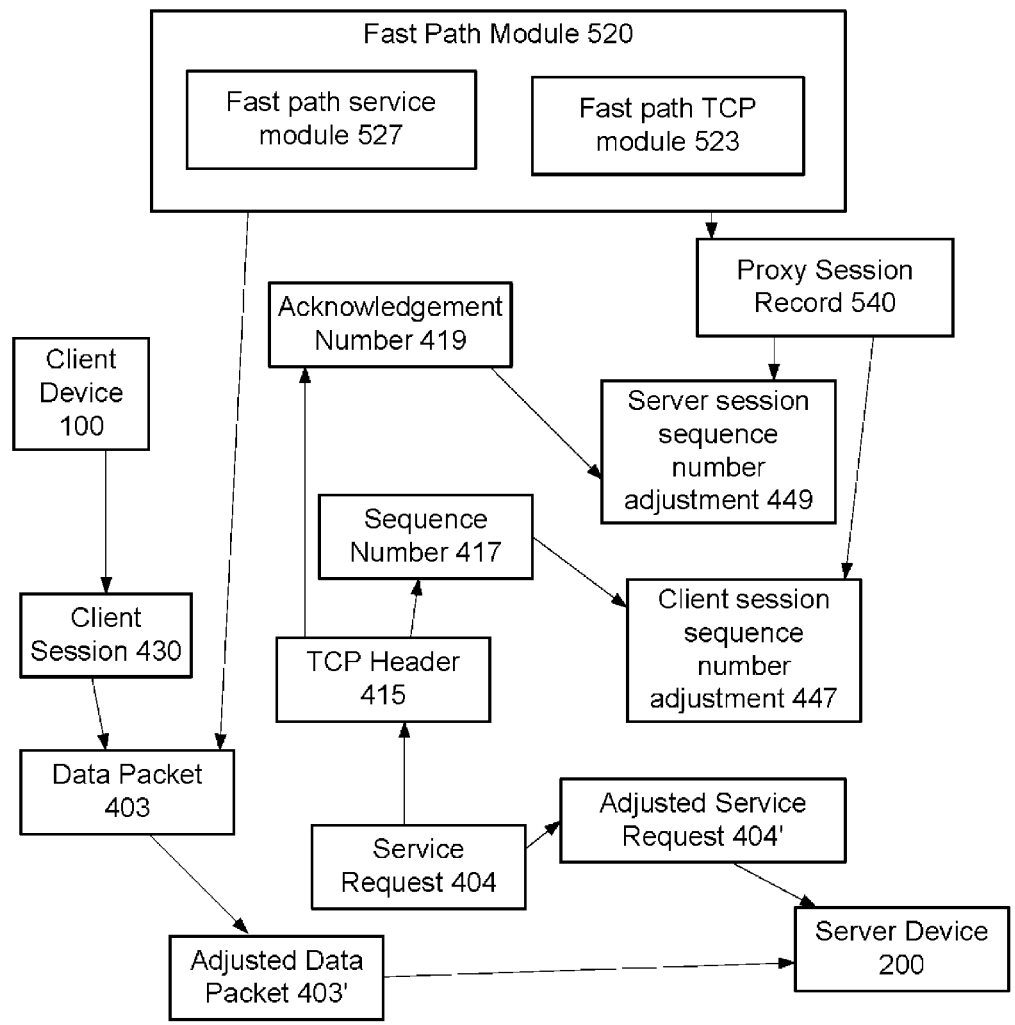
FIG. 5 illustrates an embodiment to establish a server session according to the present invention.
Figure 5A:
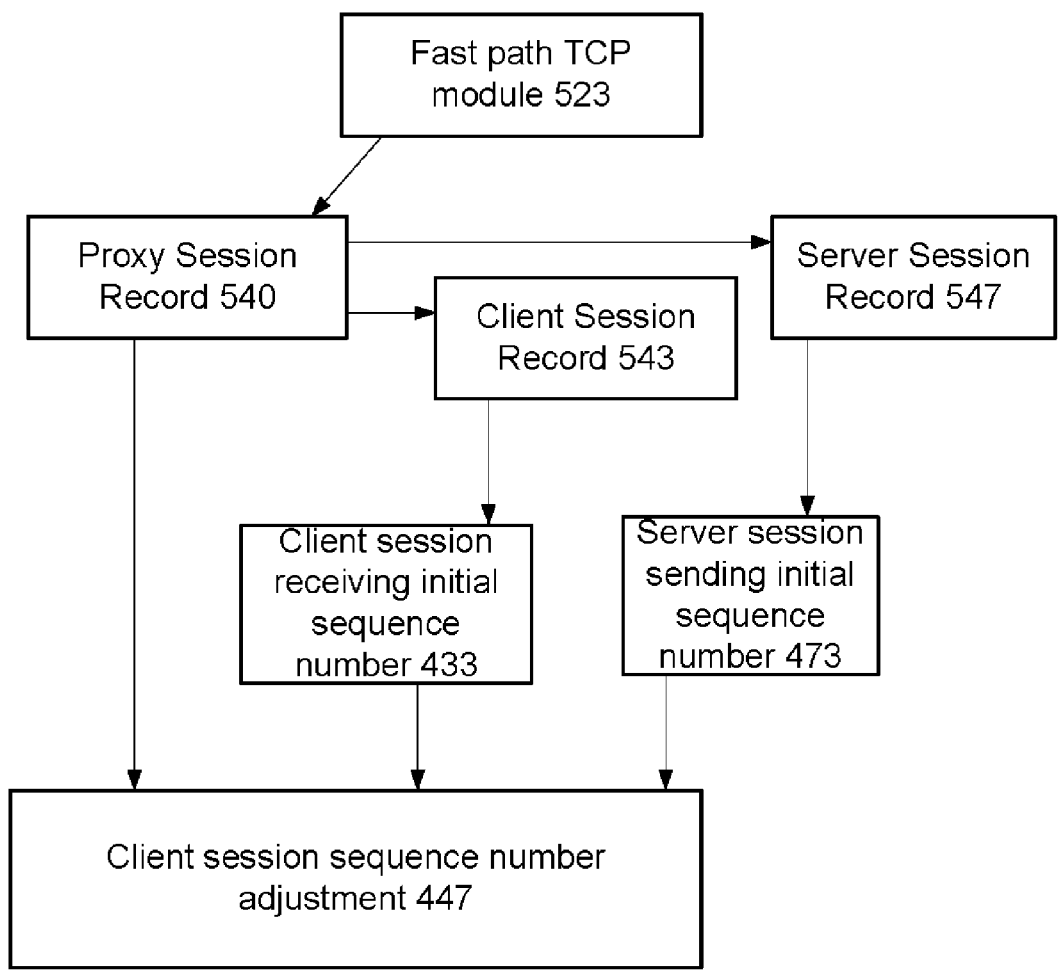
FIG. 5a illustrates an embodiment of a calculation of client session sequence number adjustment according to the present invention.

In one embodiment illustrated in FIG. 5, fast path service module 527 sends service request 404 through fast path TCP module 523 to server device 200. Fast path TCP module 523 further modifies service request 404. In one embodiment, service request 404 includes a TCP header 415. In one embodiment, fast path TCP module 523 adjusts the sequence number 417 and acknowledgment number 419 in TCP header 415. As illustrated in FIG. 5a, fast path TCP module 523 calculates client session sequence number adjustment 447 using client session receiving initial sequence number 433 in client session record 543 and server session sending initial sequence number 473 in server session record 547. In one embodiment, fast path TCP module 523 subtracts client session receiving initial sequence number 433 from server session sending initial sequence number 473 to obtain client session sequence number adjustment 447.

In one embodiment, fast path TCP module 523 stores client session sequence number adjustment 447 in proxy session record 540.

Figure 5B:
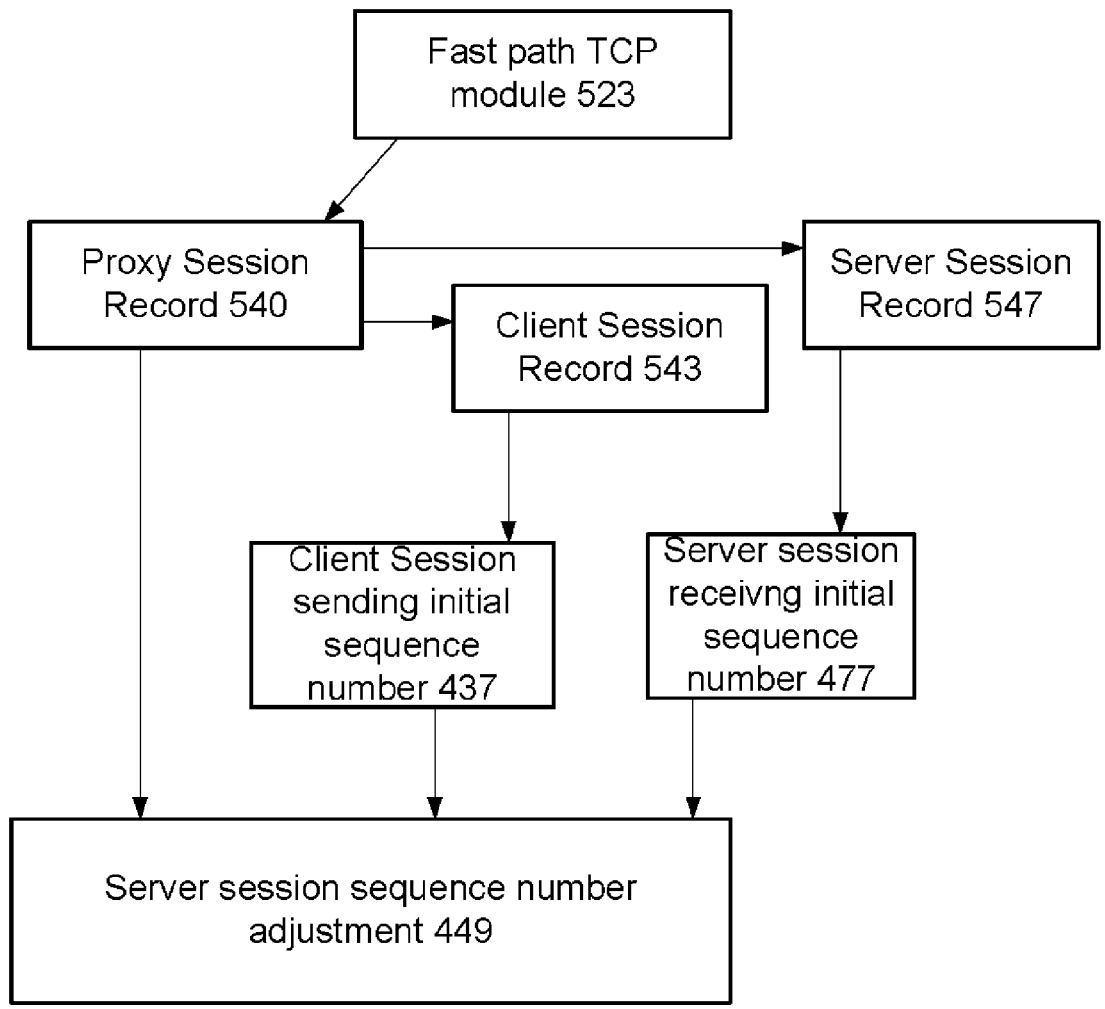
FIG. 5b illustrates an embodiment of a calculation of server session sequence number adjustment according to the present invention.

In one embodiment illustrated in FIG. 5b, fast path TCP module 523 calculates server session sequence number adjustment 449 similarly by subtracting server session receiving initial sequence number 477 in server session record 547 from client session sending initial sequence number 437 in client session record 543. In one embodiment, fast path TCP module 523 stores server session sequence number adjustment 449 in proxy session record 540.

Returning to the illustration in FIG. 5, in one embodiment, fast path TCP module 523 adjusts sequence number 417 by adding client session sequence number adjustment 447.

In one embodiment, fast path TCP module 523 adjusts acknowledge number 419 by adding server session sequence number adjustment 449.

Fast path TCP module 523 sends adjusted service request 404' to server device 200.

In one embodiment, service gateway 300 receives a TCP data packet 403 of client session 430 from client device 100. Fast path TCP module 523 adjusts data packet 403 before sending the adjusted data packet 403' to server device 200. Fast path TCP module 523 adjusts sequence number and acknowledgement number of data packet 403 similar to the adjustment described above. Fast path TCP module 523 sends adjusted data packet 403' to server device 200.

Figure 6:
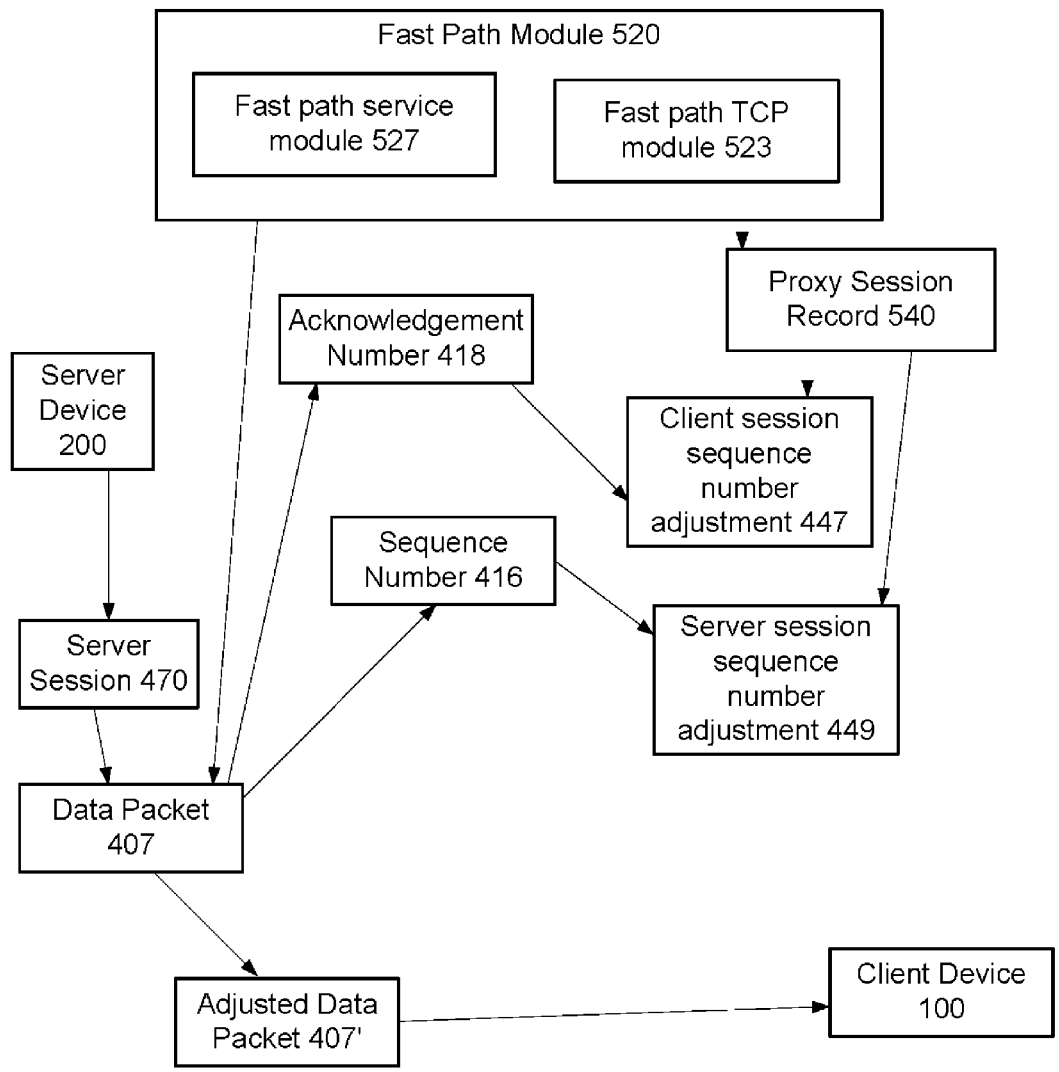
FIG. 6 illustrates an embodiment of forwarding a data packet from server device to client device according to the present invention.

In one embodiment illustrated in FIG. 6, server device 200 sends a TCP data packet 407 of server session 470 to service gateway 300. Fast path TCP module 523 receives data packet 407 and adjusts data packet 407 before sending the adjusted data packet 407' to client device 100. Fast path TCP module 523 adjusts sequence number 416 and acknowledgement number 418 of data packet 407. In one embodiment, fast path TCP module 523 adjusts the sequence number field of data packet 407 by subtracting server session sequence number adjustment 449. In one embodiment, fast path TCP module 523 adjusts the acknowledgement number field of data packet 407 by subtracting client session sequence number adjustment 447. Fast path TCP module 523 sends adjusted data packet 407' to client device 100.

In one embodiment, the adding and subtracting steps of sequence numbers need to consider TCP sequence wrap around conditions, as known to those skilled in the art.

In one embodiment, fast path service module 527 modifies service request 404, data packet 407 or data packet 403. Fast path service module 527 informs fast path TCP proxy module 523 of any packet length adjustment due to the packet modification. Fast path TCP module 523 applies proper adjustment to the sequence number adjustment steps based on the informed packet length adjustment.

Figure 7:
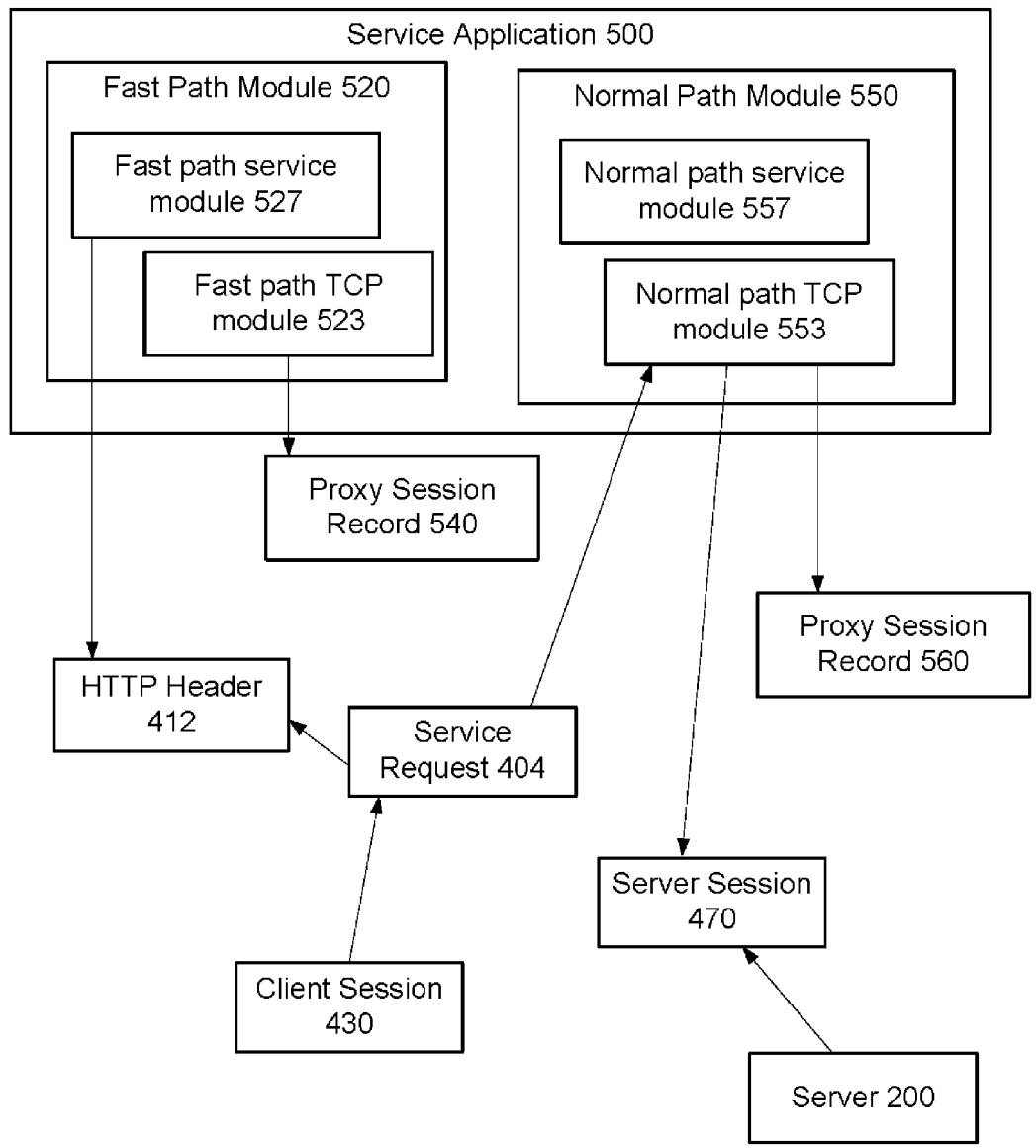
FIG. 7 illustrates an embodiment of a transition from fast path module to normal path module according to the present invention.

In one embodiment illustrated in FIG. 7, fast path service module 527 determines it cannot handle service request 404. Service application 500 instructs fast path service module 527 to send service request 404 to normal path module 550. In one embodiment, fast path service module 527 determines service request 404 contains a partial HTTP header 412. In one embodiment, partial HTTP header 412 does not include all necessary information for processing by fast path service module 527, including one or more conditions such as comprising a complete HTTP header, a partial URI, a partial HTTP header field, or a partial cookie field. In one embodiment, partial HTTP header 412 indicates service request 404 is an IP packet fragment. In one embodiment, fast path service module 527 cannot handle service request 404 when service request 404 includes unexpected information such as an unexpected URI, a missing expected cookie field, or a missing expected HTTP header attribute. In one embodiment, fast path service module 527 determines an error condition when processing service request 404.

Fast path service module 527 sends service request 404 to normal path module 550. In one embodiment, normal path TCP module 553 receives service request 404 and retrieves proxy session record 540 from fast path TCP module 523. Normal path TCP module 553 creates proxy session record 560 based on service request 404 and proxy session record 540.

Figure 8:
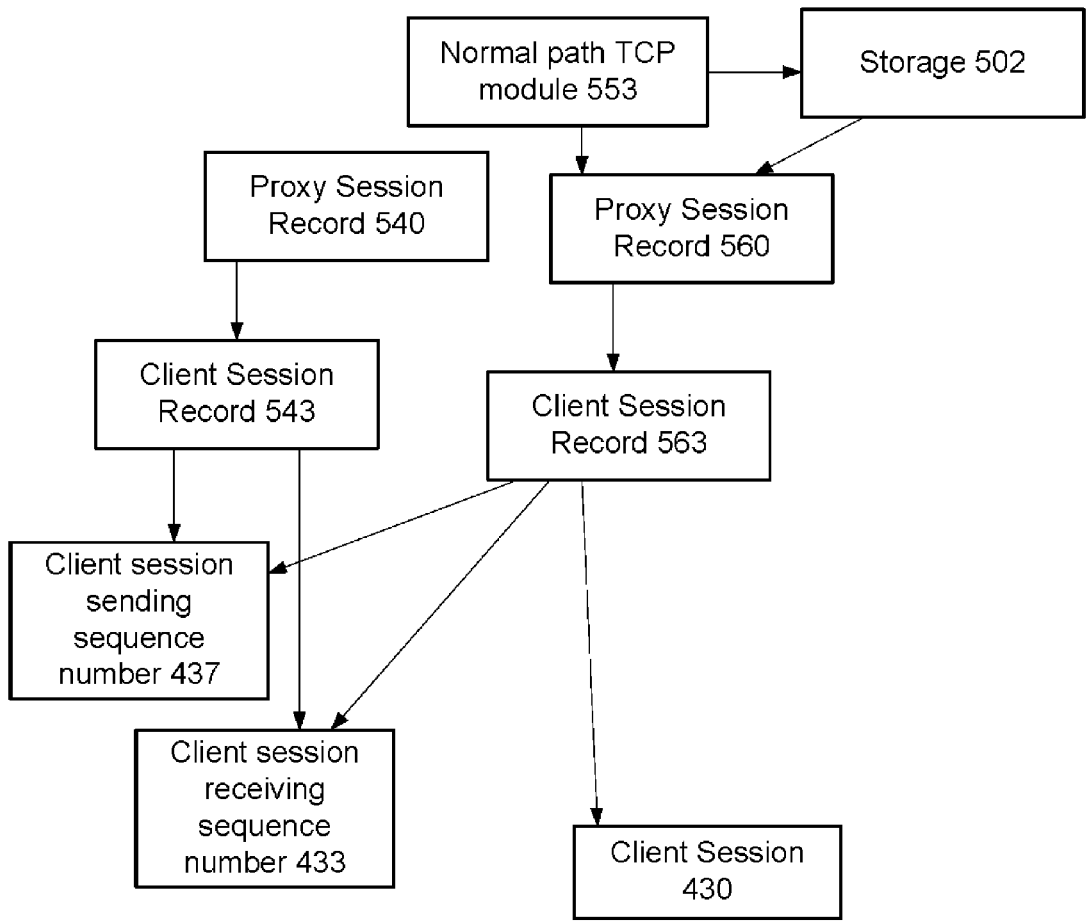
FIG. 8 illustrates an embodiment of a creation of proxy session record for normal path TCP module using proxy session record for fast path TCP module according to the present invention.

As illustrated in an embodiment in FIG. 8, normal path TCP module 553 creates client session record 563 based on client session record 543 associated to proxy session record 540 and service request 404. Normal path TCP module 553 obtains client session receiving initial sequence number 433 and client session sending initial sequence number 437 from client session record 543 and stores them into client session record 563. Normal path TCP module 553 creates other necessary TCP session state variables and buffers for client session 430. These TCP session state variables and buffers are known to the skilled in the art and are not described here. In one embodiment, normal path TCP module 553 stores these TCP session state variables and buffers in client session record 563. Normal path TCP module 553 associates client session record 563 with proxy session record 560. In one embodiment proxy session record 560 includes client session record 563. In one embodiment, normal path TCP module 553 stores proxy session record 560 in storage 502.

Returning to the illustration in FIG. 7, normal path TCP module 553 subsequently processes service request 404 as if normal path TCP module 553 receives service request 404 from client session 430. Normal path TCP module 553 performs the usual TCP protocol steps onto service request 404, as known to those skilled in the art.

In one embodiment, normal path TCP module 553 informs normal path service module 557 of service request 404. In one embodiment, service request 404 is a HTTP request. Normal path service module 557 processes the HTTP request. Normal processing of the HTTP request of service request 404 is known to those skilled in the art. Such typical processing includes selecting server device 200, establishing a normal server TCP session 470 with server device 200, receiving TCP data packets from client session 430 (server session 470), processing sequence number fields and acknowledgement fields of the received TCP data packets, forwarding the content of the received TCP data packet to be sent to server session 470 (client session 430), generating TCP data packets for server session 470 (client session 430) based on the forwarded content, calculating sequence number fields and acknowledgement fields for the generated TCP data packets, sending the generated TCP data packets. Details of the processing are known to those skilled in the art and are not further described here.

In one embodiment, service request 404 is a SIP request, or other request known to the skilled in the art. A typical processing of such service request by normal path module 550 is not further described here.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A service gateway, comprising:
a fast path module for processing data packets without using packet buffers, the fast path module stored in memory at the service gateway and executed by at least one processor, wherein the fast path module:
receives a service request data packet from a client side session between a client and the service gateway;
determines that the service request data packet cannot be processed by the fast path module; and
in response to determining that the service request data packet cannot be processed by the fast path module, sends the service request data packet to a normal path module for processing data packets using one or more packet buffers, the normal path module stored in memory at the service gateway and executed by the at least one processor, wherein in response to receiving the service request data packet from the fast path module, the normal path module:
retrieves a first proxy session record created by the fast path module, wherein the first proxy session record is associated with a client session record for the client side session;
creates a second proxy session record and a second client session record based on the service request data packet and the client session record associated with the first proxy session record;
associates the second client session record with the second proxy session record;
obtains a client session receiving initial sequence number and a client session sending initial sequence number from the client session record associated with the first proxy session record;
creates one or more TCP session state variables and one or more packet buffers for the client side session;
stores the client session receiving initial sequence number, the client session sending initial sequence number, and the one or more TCP session state variables in the second client session record; and
processes the service request data packet according to the second proxy session record.

2. The service gateway of claim 1, wherein in determining that the service request data packet cannot be processed by the fast path module, the fast path module:
determines that the service request data packet:
does not contain a complete HTTP header;
contains only a partial URI;
contains only a partial HTTP header field;
contains only a partial HTTP cookie field;
indicates an IP packet fragment;
contains an unexpected URI;
does not contain an expected cookie field; or
does not contain an expected HTTP header attribute.

3. A method for processing HTTP packets by a service gateway implemented by a processor, comprising:
receiving, by a fast path module of the service gateway implemented by the processor, a service request data packet from a client side session between a client and the service gateway, wherein the fast path module processes data packets without using packet buffers;
determining that the service request data packet cannot be processed by the fast path module;
in response to determining that the service request data packet cannot be processed by the fast path module, sending the service request data packet from the fast path module to a normal path module of the service gateway implemented by the processor, wherein the normal path module processes data packets using one or more packet buffers;
in response to receiving the service request data packet from the fast path module, retrieving by the normal path module a first proxy session record created by the fast path module, wherein the first proxy session record is associated with a client session record for the client side session;
creating by the normal path module a second proxy session record and a second client session record based on the service request data packet and the client session record associated with the first proxy session record, wherein the creating comprises:
obtaining by the normal path module a client session receiving initial sequence number and a client session sending initial sequence number from the client session record associated with the first proxy session record;
creating one or more TCP session state variables and one or more packet buffers for the client side session; and
storing the client session receiving initial sequence number, the client session sending initial sequence number, and the one or more TCP session state variables in the second client session record;
associating the second client session record with the second proxy session record; and
processing the service request data packet by the normal path module according to the second proxy session record.

4. The method of claim 3, wherein the determining that the service request data packet cannot be processed by the fast path module comprises determining that the service request data packet:
does not contain a complete HTTP header;
contains only a partial URI;
contains only a partial HTTP header field;
contains only a partial HTTP cookie field;
indicates an IP packet fragment;
contains an unexpected URI;
does not contain an expected cookie field; or
does not contain an expected HTTP header attribute.

5. A system, comprising:
a processor; and
a computer readable storage medium having computer readable program code embodied therewith, the computer readable program code, when executed by the processor, configured to:
receive at a network interface, by a fast path module of a service gateway implemented by the processor, a service request data packet from a client side session between a client and the service gateway, wherein the fast path module processes data packets without using packet buffers;
determine that the service request data packet cannot be processed by the fast path module;

in response to determining that the service request data packet cannot be processed by the fast path module, send the service request data packet from the fast path module to a normal path module of the service gateway implemented by the processor, wherein the normal path module processes data packets using one or more packet buffers;

in response to receiving the service request data packet from the fast path module, retrieve by a network interface of the normal path module a first proxy session record created by the fast path module, wherein the first proxy session record is associated with a client session record for the client side session;

create by the normal path module a second proxy session record and a second client session record based on the service request data packet and the client session record associated with the first proxy session record;

associate the second client session record with the second proxy session record;

obtain by the normal path module a client session receiving initial sequence number and a client session sending initial sequence number from the client session record associated with the first proxy session record;

create one or more TCP session state variables and one or more packet buffers for the client side session;

store the client session receiving initial sequence number, the client session sending initial sequence number, and the one or more TCP session state variables in the second client session record; and process the service request data packet by the normal path module according to the second proxy session record.

6. The system of claim 5, wherein the computer readable program code configured to determine that the service request data packet cannot be processed by the fast path module is further configured to determine that the service request data packet:
does not contain a complete HTTP header;
contains only a partial URI;
contains only a partial HTTP header field;
contains only a partial HTTP cookie field;
indicates an IP packet fragment;
contains an unexpected URI;
does not contain an expected cookie field; or
does not contain an expected HTTP header attribute.

7. A service gateway, comprising:
a fast path module for processing data packets without using packet buffers; and
a normal path module for processing data packets using one or more packet buffers, wherein the fast path module:
receives a first service request data packet from a client side session between a client and the service gateway;
determines that the service request data packet can be processed by the fast path module;
in response to determining that the service request data packet can be processed by the fast path module, adjusts a sequence number in the service request data packet using a calculated client session sequence number adjustment stored in the first proxy session record;
adjusts an acknowledgement number in the service request data packet by the calculated client session sequence number adjustment;
sends the adjusted service request data packet over a server side session between a server and the service gateway;
receives a second service request data packet from a client side session between a client and the service gateway;
determines that the second service request data packet cannot be processed by the fast path module; and
in response to determining that the second service request data packet cannot be processed by the fast path module, sends the second service request data packet to the normal path module,
wherein in response to receiving the second service request data packet from the fast path module, the normal path module:
retrieves a first proxy session record created by the fast path module, wherein the first proxy session record is associated with a client session record for the client side session;
creates a second proxy session record based on the second service request data packet and the client session record associated with the first proxy session record; and
processes the second service request data packet according to the second proxy session record.

8. The service gateway of claim 7, wherein in determining that the second service request data packet cannot be processed by the fast path module, the fast path module determines that the second service request data packet:
does not contain a complete HTTP header;
contains only a partial URI;
contains only a partial HTTP header field;
contains only a partial HTTP cookie field;
indicates an IP packet fragment;
contains an unexpected URI;
does not contain an expected cookie field; or
does not contain an expected HTTP header attribute.

9. A method for processing HTTP packets by a service gateway implemented by a processor, comprising:
receiving, by a fast path module of the service gateway implemented by the processor, a first service request data packet from a client side session between a client and the service gateway, wherein the fast path module processes data packets without using packet buffers;
determining that the first service request data packet can be processed by the fast path module;
in response to determining that the first service request data packet can be processed by the fast path module, adjusting a sequence number in the first service request data packet using a calculated client session sequence number adjustment stored in the first proxy session record;
adjusting an acknowledgement number in the service request data packet by the calculated client session sequence number adjustment;
sending the adjusted first service request data packet over a server side session between a server and the service gateway;
receiving, by the fast path module of the service gateway implemented by the processor, a second service request data packet from a client side session between a client and the service gateway;
determining that the second service request data packet cannot be processed by the fast path module;
in response to determining that the second service request data packet cannot be processed by the fast path module, sending the second service request data packet from the fast path module to a normal path module of the service gateway implemented by the processor, wherein the normal path module processes data packets using one or more packet buffers;

in response to receiving the second service request data packet from the fast path module, retrieving by the normal path module a first proxy session record created by the fast path module, wherein the first proxy session record is associated with a client session record for the client side session;

creating by the normal path module a second proxy session record based on the second service request data packet and the client session record associated with the first proxy session record; and processing the second service request data packet by the normal path module according to the second proxy session record.

10. The method of claim 9, wherein the determining that the second service request data packet cannot be processed by the fast path module comprises determining that the second service request data packet:
   does not contain a complete HTTP header;
   contains only a partial URI;
   contains only a partial HTTP header field;
   contains only a partial HTTP cookie field;
   indicates an IP packet fragment;
   contains an unexpected URI;
   does not contain an expected cookie field; or
   does not contain an expected HTTP header attribute.

11. A system, comprising:
a processor; and
a computer readable storage medium having computer readable program code embodied therewith, the computer readable program code, when executed by the processor, configured to:
   receive at a network interface, by a fast path module of a service gateway implemented by the processor, a first service request data packet from a client side session between a client and the service gateway, wherein the fast path module processes data packets without using packet buffers;
   determine that the first service request data packet can be processed by the fast path module;
   in response to determining that the first service request data packet can be processed by the fast path module:
      adjust a sequence number in the first service request data packet using a calculated client session sequence number adjustment stored in the first proxy session record;
      adjust an acknowledgement number in the first service request data packet by the calculated client session sequence number adjustment; and
      send the adjusted service request data packet over a server side session between a server and the service gateway;
   receive at a network interface, by a fast path module of a service gateway implemented by the processor, a second service request data packet from a client side session between a client and the service gateway;
   determine that the second service request data packet cannot be processed by the fast path module;
   in response to determining that the second service request data packet cannot be processed by the fast path module, send the second service request data packet from the fast path module to a normal path module of the service gateway implemented by the processor, wherein the normal path module processes data packets using one or more packet buffers;
   in response to receiving the second service request data packet from the fast path module, retrieve by a network interface of the normal path module a first proxy session record created by the fast path module, wherein the first proxy session record is associated with a client session record for the client side session;
   create by the normal path module a second proxy session record based on the second service request data packet and the client session record associated with the first proxy session record; and
   process the second service request data packet by the normal path module according to the second proxy session record.

12. The system of claim 11, wherein the computer readable program code configured to determine that the second service request data packet cannot be processed by the fast path module is further configured to determine that the second service request data packet:
   does not contain a complete HTTP header;
   contains only a partial URI;
   contains only a partial HTTP header field;
   contains only a partial HTTP cookie field;
   indicates an IP packet fragment;
   contains an unexpected URI;
   does not contain an expected cookie field; or
   does not contain an expected HTTP header attribute.

* * * * *